(12) United States Patent
Dosch et al.

(10) Patent No.: US 12,026,161 B2
(45) Date of Patent: Jul. 2, 2024

(54) HIERARCHICAL DATACUBE QUERY PLAN GENERATION

(71) Applicant: AtScale, Inc., San Mateo, CA (US)

(72) Inventors: Daniel J. Dosch, Santa Clara, CA (US); Sarah Gerweck, San Mateo, CA (US)

(73) Assignee: AtScale, Inc., Boston, MA (US)

( * ) Notice: Subject to any disclaimer, the term of this patent is extended or adjusted under 35 U.S.C. 154(b) by 0 days.

(21) Appl. No.: 17/368,932

(22) Filed: Jul. 7, 2021

(65) Prior Publication Data

US 2022/0012242 A1 Jan. 13, 2022

Related U.S. Application Data

(60) Provisional application No. 63/049,046, filed on Jul. 7, 2020.

(51) Int. Cl.
*G06F 16/2453* (2019.01)
*G06F 11/34* (2006.01)
*G06F 16/22* (2019.01)
*G06F 16/2455* (2019.01)
*G06F 16/28* (2019.01)

(52) U.S. Cl.
CPC .... *G06F 16/24544* (2019.01); *G06F 11/3419* (2013.01); *G06F 16/2246* (2019.01); *G06F 16/24556* (2019.01); *G06F 16/2456* (2019.01); *G06F 16/283* (2019.01)

(58) Field of Classification Search
None
See application file for complete search history.

(56) References Cited

U.S. PATENT DOCUMENTS

| | | | | |
|---|---|---|---|---|
| 2013/0097114 A1* | 4/2013 | Burke | ................. | G06F 16/2452 |
| | | | | 707/769 |
| 2015/0363465 A1* | 12/2015 | Bordawekar | ....... | G06F 16/9027 |
| | | | | 707/718 |
| 2019/0220464 A1* | 7/2019 | Butani | .............. | G06F 16/24542 |
| 2019/0347263 A1* | 11/2019 | Ballantine | ............. | G06F 40/134 |
| 2020/0401581 A1* | 12/2020 | Eubank | ............... | G06F 16/2456 |

OTHER PUBLICATIONS

Johnston, "Method and system for using queries for multidimensional databases with database of other types", 2009 (Year: 2009).*

* cited by examiner

*Primary Examiner* — Dawaune A Conyers
(74) *Attorney, Agent, or Firm* — Armis IP Law, LLC

(57) ABSTRACT

A multidimensional database query engine processes a query request by forming a logical plan of subqueries for retrieving and assembling the data called for by the query request. A multi-pass analysis identifies a granularity of facts needed to fulfill the query request. A recursive analysis parses the query request and identifies components comprising the full query request. The analysis derives a subquery from each component, and identifies dependencies on other subqueries. The subqueries are arranged in a tree structure based on the dependencies. The tree represents subqueries as nodes, with query operations denoted by parent nodes for the dependent subqueries. The result is a hierarchical tree of subqueries associated based on operations between the subqueries and dependent subqueries descending from their parent subqueries.

15 Claims, 3 Drawing Sheets

HIERARCHICAL DATACUBE QUERY PLAN GENERATION

RELATED APPLICATIONS

This patent application claims the benefit under 35 U.S.C. § 119(e) of U.S. Provisional Patent App. No. 63/049,046, filed Jul. 7, 2020, entitled "HIERARCHICAL DATACUBE QUERY PLAN GENERATION," incorporated herein by reference in entirety.

BACKGROUND

Multidimensional databases evolved from conventional relational databases by extending the notion of a two dimensional "table" of tabular information into a so-called datacube arrangement having a plurality of dimensions bounded only by available processor and memory capabilities. Multidimensional databases allow for more complex queries, and have evolved to relieve the user of knowing the physical location of the data sought by the multidimensional query. Accordingly, the logical notion of a single multidimensional database, often referred to as a datacube, typically references at least several physical data repositories, or storage locations, of the data stored therein. The multidimensional database therefore provides a query operator with a single view of a database which may invoke many physical data stores, and data arrangements therein (tables, lists, unstructured collections, etc.) for accessing data to satisfy a query request.

Queries directed to multidimensional databases, therefore, provide substantial query capability based on an ability to apply logic based on each of the dimensions. In contrast to conventional relational models (RDBMS), which impose a traversal of two dimensional data tables for a query response, multidimensional databases allow an arbitrary number of dimensions to define the data. Computing resources required for query processing, however, tends to rise exponentially with the number of dimensions, imposing a practical limit on the number of multidimensional entries which may be handled.

SUMMARY

A multidimensional database query engine processes a query request by forming a logical plan of subqueries for retrieving and assembling the data called for by the query request. A multi-pass analysis identifies a granularity of facts needed to fulfill the query request. A recursive analysis parses the query request and identifies components comprising the full query request. The analysis derives a subquery from each component, and identifies dependencies on other subqueries. The subqueries are arranged in a tree structure based on the dependencies. The tree represents subqueries as nodes, with query operations denoted by parent nodes for the dependent subqueries. The result is a hierarchical tree of subqueries associated based on operations between the subqueries and dependent subqueries descending from their parent subqueries.

Configurations herein are based, in part, on the observation that the multitude of dimensions called for by a query request increase processing and memory requirements, which tend to expand exponentially as dimensions grow. Unfortunately, conventional analysis of query requests involves an iterative approach that injects redundancy and computational expense into the query processing. The iterative approach results in a linear sequence having the appearance of subqueries arranged in a "flat" tree after decomposing the query request into subqueries. Accordingly, configurations herein substantially overcome the shortcomings of conventional iterative query plans by generating a hierarchical query plan amendable to recursive processing.

A method of planning a logical composition of a query directed to data stored in fact tables of a multidimensional datacube defines a recursive ordering of subqueries and cube operations for returning a response to a query request. A query engine analyzes the request for determining components defined by dimensional granularity and dependencies between the data, and forms, for each component, a subquery based on a subset of dimensions for computing the subquery and any dependencies on other components. The query engine generates a hierarchical ordering defined by a tree including a node for each subquery and a node for each query operation performed on the subquery nodes.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The query engine invoked for query processing receives a query request from a user interface, and arranges a query plan for addressing the physical data stores needed to satisfy the query request, including joins across multiple dimensions and quite likely, different physical data stores.

Figure 1:
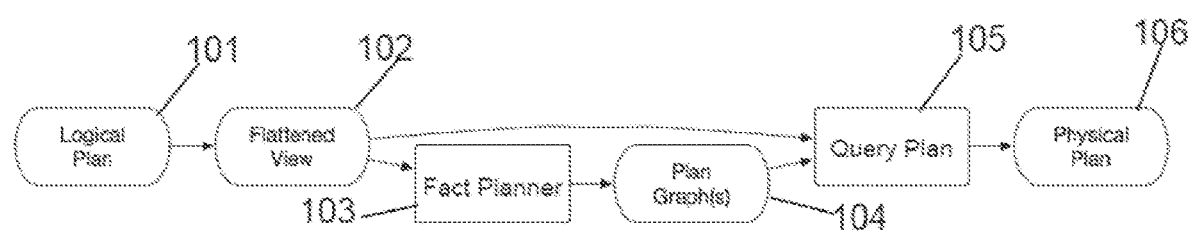
FIG. 1 shows generation of a conventional query plan.

FIG. 1 shows generation of a conventional prior art query plan. At step 101, a logical plan of accessed data entities is generated to reflect steps of query processing. A flattened view 102 reflects the granularities and subspaces defined in the query. A fact planner 103 identifies logical data entities and dimensions for access, and one or more plan graphs denotes the physical data entities for access. The results are fed into a query plan process 105, which uses this information to formulate the physical plan 106 of iterative physical datastore accesses.

Figure 2:
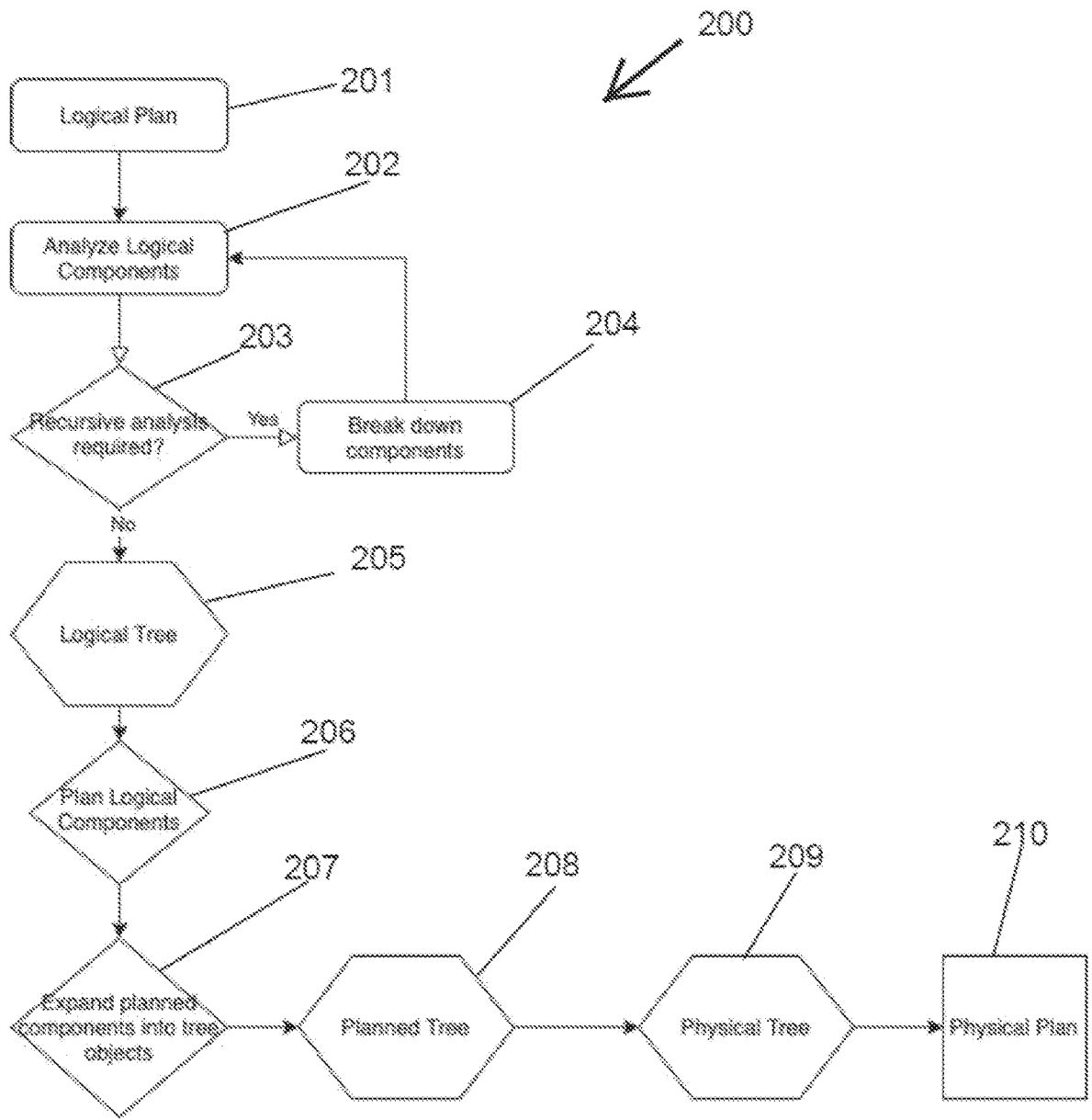
FIG. 2 shows a flow diagram of query generation according to subcube generation as defined herein.

In contrast, referring to FIG. 2, in a datacube environment having a multidimensional arrangement of data adapted for OLAP (Online Analytical Processing), a method 200 of planning query operations for retrieving a response to a query request includes receiving a request for retrieval of data from the datacube based on a plurality of selections received from a user to form a logical plan 201. The hierarchy of nodes, in contrast to a conventional flat structure, is employed to guide the traversal.

The received request is analyzed at step 202 to determine a plurality of components based on dependencies between the components and a dimensional granularity imposed by each of the components. A check is performed, at step 203, to identify if a recursive analysis is appropriate, and if so, components which depend on completion of other components, such as values derived from other dimensions in the query request, identified at step 204. The recursively defined ordering is used to form the components into subqueries, each subquery indicative of a subset of dimensions and one or more conditions in a logical tree 205. Each component therefore defines a portion of the full query request which may be broken out into a subcube, or subset of the entire datacube and partitioned as a logical plan on a subset of the dimensions and fields of the full datacube.

The logical tree identifies dependencies between the subqueries and denotes a cube operation between the subqueries based on the identified dependencies. For example, a query to compare a current day's sales with a previous day's sales involves subqueries of a day D and a day D−1. Each defines a subquery, and is related by an operation denoting the comparison between them. The query operations are generally datacube operations including at least one of aggregation, join, union, constraint, having/inclusion, ordering and limiting.

Since dimensions of the data cube involve varying forms of physical storage, corresponding access to retrieve atomic data items needs to derive from the logical plan. A physical, atomic data item resides in a repository in a fact table, and is generally referenced by multiple dimensional tables. Logical components are planned at step 206, and expanded into tree objects 207, defined by nodes in a hierarchical tree, resulting in a planned tree 208. Such a hierarchical plan is a faster and simpler alternative to flat or linear plans.

From the planned tree, the query engine builds a physical hierarchical tree 209 indicative of an ordering between the subqueries based on the dependencies for retrieving and rendering the data called for by the received request. Each component defines a subquery or an operation between subqueries, wherein the subqueries reference one fact table and one or more dimensional tables. Analysis continues such that each subquery targets a single fact table; if more fact tables are called for, decomposition into additional subqueries occurs. A subset of dimensions denote a subcube including contents of a cube that has been reduced to the set of factual and dimensional data required by a particular query request. Each subquery references only the subset of dimensions it needs.

Based on the dependencies and dimensions in the logical tree, each leaf node in the hierarchical physical tree denotes a subquery, such that the subquery is based on a fact and dimensional grouping called for by the query request, or, more succinctly, one fact table and zero or more dimensional tables. Identification of a physical data repository, where the fact table or tables referenced by each subquery reside, denotes the physical plan 210. The leaf nodes generally define a single subqueries, and query processing aggregates the data derived from the nodes such that joins and other parent nodes then aggregate the data from the leaf nodes denoting subqueries.

In the database environment of FIGS. 1 and 2, a query is received using a syntax such as SQL (Structured Query Language) or MDX (Multidimensional Expressions). SQL is often employed for relational databases, while MDX is a syntax developed for defining multidimensional objects and querying and manipulating multidimensional data in OLAP databases. Both are generally human readable as text strings. Configurations herein parse an incoming string representing a subject query and generate query instructions for traversing the multidimensional database to which it is directed, and may also be an ASCII text based string.

The query analysis for fact and dimensional granularity identification as disclosed herein performs a multi-pass analysis, a tree based virtual cube model, and transformation process to turn a virtual cube into a physical query plan. Multi-pass analysis refers to accessing a relative field for computing the value relative to another variable or dimension—in this case, sales values (quantity) based on one day and the corresponding values for a relative value: (day−1), thus invoking similar computations but for a different match criteria for a time dimension.

In the following example, SQL and MDX queries are processed and turned into logical plans. Analysis is performed on the logical plan to determine the fact data groupings, and which dimensional attributes are in scope of those groupings. Analysis is based on a graph structures of nodes depicting the that represent a project's model.

Aspects of this analysis involve defining separate subquery for each fact & dimensional grouping, also known as a granularity of the subquery. The relative aspect allows for a fact that may be recursively dependent on other facts, which may be at different granularities, for example time in days and time on a monthly basis. Accordingly, analysis may have to be performed multiple times on the dependents of a fact, and their dependents and so on, thus invoking the multi-pass part of the approach, discussed in more detail below.

Different granularities may be required for reasons including, but not limited to: fact selections spanning multiple fact tables, dimensional groupings at different levels, dimensions that are not in scope for some of the facts, or non-additive or semi-additive fact aggregations. In sum, for performing a query in which some of the values depend on computations based on other values (facts) in the same query.

Figure 3:
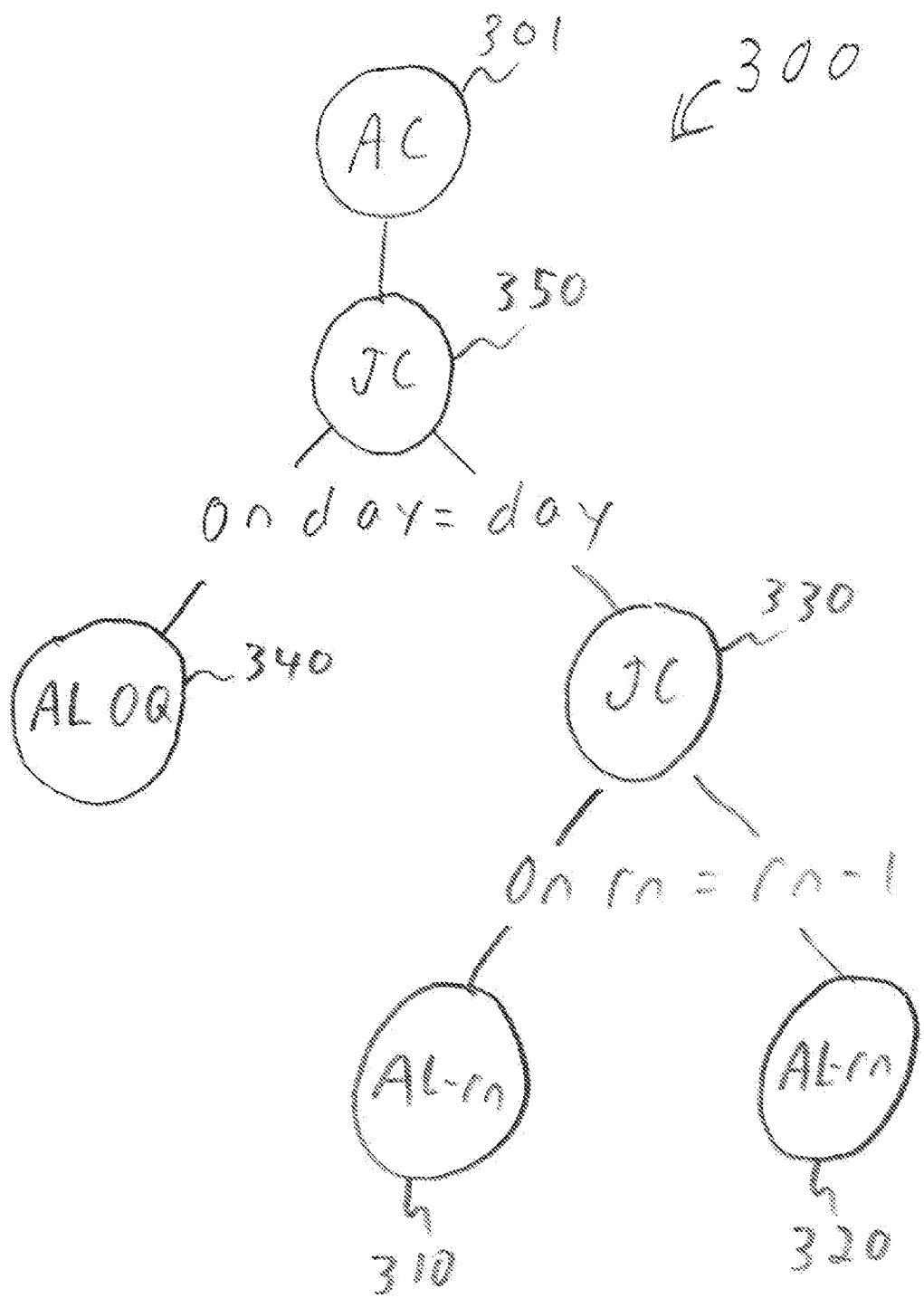
FIG. 3 shows a tree representation of a query plan generated by the approach of FIG. 2.

FIG. 3 shows a tree representation of a query plan generated by the approach of FIG. 2. In the example of FIG. 3, a time relative feature is demonstrated that allows a query to effectively reference a field relative to itself for a different time. In the example shown, a different time such as sales for a previous day, month, or other sales period is demonstrated. This is performed by altering a query selection value to be relative to another value in the same query—such as day and day−1 to identify different values corresponding to the same dimension—in this case the time/date of the queried value.

The multi-pass part feature is therefore invoked to handle depth and complexity of OLAP cubes and their functions. It is based on the ability to analyze and break down facts by their granularity, recursively splitting the granularities into sub-parts, re-analyzing the sub-parts and continuing this analysis until all facts have been fully analyzed. planning all of the individual sub-parts, and then constructing a tree based model that can stitch all of the sub-parts together to create the final physical query.

The disclosed approach relies on a virtual cube, which allows representation of the result of logical operations performed on an OLAP cube. These logical operations are represented as a tree structure to select, aggregate and manipulate OLAP cube data to obtain the desired result of a query. These operations include:

Aggregation—factual data aggregated with a specific dimensionality, such that leaves of the virtual cube tree may or may not be aggregated (representing raw fact data in the unaggregated case)

Joins—joining the dimensional and/or factual data of two virtual cubes

Unions—unioning the factual data of multiple virtual cubes with the same dimensional granularity Constraints—dimensionally filtering the pre or post aggregation pass of a virtual cube Having—factual filtering results of a virtual cube
Ordering—ordering the results of a virtual cube
Limit—limiting the results from a virtual cube Operation of the virtual cube is capable of creating a physical query plan for the data transformations it represents. Since a virtual cube is represented as a tree, nodes of the tree with children will call on their children to construct themselves, and then use those results to continue building itself.

In FIG. 3, a tree structure 300 depicting a relative value in a query is shown. The logical plan of FIG. 2 shows defining a subquery based on a subcube for the dimensions and values sought by a component of the received query. The tree structure of FIG. 3 shows a structure of a query for iterative or recursively retrieving values from a second subcube based on the corresponding relative value in the first subcube. The received query may, for example, be a query for a sales quantity change from one day based on the previous day's sales data.

In the query of FIG. 3, a new type of value will be added to represent one that has had its dimensional requirements modified, and a new subcube defined for this new value. This involves identifying, in the request, a first component referencing at least one dimension, such as the sales count for a particular day. Another component is for identifying, in the request, a second component referencing a value relative to the dimension referenced by the first component, in this case the previous day. In a dimension (list) sorted such by incrementing dates, the previous day's data would be given and a current row−1, denoted as row number (rn)−1. Alternatively, another criteria could be used, such as referencing a day field or value and the previous day value. Each component is represented by a subquery in the graph 300, where node 310 defines aggregation logic (AL) for a row number corresponding to a date, and a sibling node 320 defines aggregation logic for (rn−1) to yield the previous day's sales data. Each node 310, 320 represents defining a subquery for retrieving the data referenced by the first component and the data referenced by the second component, respectively. A parent node 330 calls for a join (join cube, or JC). The graph 300 therefore defines a tree 300 including a node 310, 320 for each of the defined subqueries and a node 330 for a join combining the results of each of the subqueries.

A further operation includes the sales data, or order quantity (OQ) corresponding to each day. The tree 300 includes the node for a join for the node 330 joining the subqueries and a node 340 for an aggregation of a value corresponding to each of the subqueries.

As indicated above, the first component and the second subcomponent, and corresponding subqueries, refer to a time value, such that the second component is based on an offset of a time value defined by the first component, shown by "on rn=rn−1", and the defined tree includes a join for a quantity value occurring within the time called for by each of the first and second components. This occurs in the higher level join at node 350, designated by note 301 for aggregation logic (AL), performing a further join of the relative values at node 330, and the order quantity data at node 340. In the example shown, the referenced dimension corresponds to a time value, and the relative dimension corresponds to a different time value, or previous day, however any suitable arrangement of a query based on a value and a relative value could be envisioned.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of planning a logical composition of a query, the query directed to data stored in fact tables of a multidimensional datacube for defining a recursive ordering of subqueries and cube operations for returning a response to a query request, comprising:

receiving, at a query engine, a request from a user interface;

analyzing the request for determining components defined by dimensional granularity and dependencies between the data, each component including at least one dimension stored in a database table on a storage medium and indicative of a set of values corresponding to the dimension;

identifying, in the request, a first component referencing at least one dimension;

identifying, in the request, a second component referencing a value relative to the dimension referenced by the first component;

forming, for each component, a subquery based on a subset of dimensions of the multidimensional datacube for computing the subquery and a dependency on other components, including:

defining a subquery for retrieving the data referenced by the first component;

defining a subquery for retrieving the data referenced by the second component, further comprising:

forming a plurality of subcubes, further comprising a first subcube for satisfying the first subquery and a second subcube for satisfying the second subquery; and generating a hierarchical ordering defined by a tree including a node for each subquery and a node for each query operation performed on the subquery nodes;

defining, in the hierarchical ordering, a recursive reference from a dimension in the first subcube to the relative reference of a dimension in the second subcube;

recursively retrieving values from the second subcube based on the corresponding relative value in the first subcube; and rendering a result based on the subqueries corresponding to the first component and the second component.

2. The method of claim 1, wherein the query operations are datacube operations including at least one of aggregation, join, union, constraint, having/inclusion, ordering, limiting.

3. The method of claim 1, wherein the subqueries reference one fact table and one or more dimensional tables.

4. The method of claim 1, further comprising defining a tree including a join for the node joining the subqueries and a node for an aggregation of a value corresponding to each of the subqueries.

5. The method of claim 4, wherein the first component and the second subcomponent refer to a time value, the second component based on an offset of a time value defined by the first component, and the defined tree includes a join for a quantity value occurring within the time called for by each of the first and second components.

6. The method of claim 1, wherein the referenced dimension corresponds to a time value, and the relative dimension corresponds to a different time value.

7. The method of claim 1, further comprising identifying the first component and the second component by identifying values of a dimension related by an incremental quantity.

8. A data structure stored in a computer memory for defining a query of a multidimensional database having a plurality of dimensions and a plurality of query parameters including a query parameter relative to another of the plurality of query parameters, comprising:
a processor for implementing:
an interface to a multidimensional database including a query engine responsive to a request from a user interface, the multidimensional database defined as a datacube stored in a database table on a storage medium;
a plurality of subcubes based on the datacube, each subcube including at least one dimension and one field from the datacube;
a graph having a plurality of vertices and a plurality of nodes defining a tree stored in the computer memory;
the tree denoting dependencies in a query request, the nodes in the tree indicative of components defined by dimensional granularity and dependencies between the data, each component including at least one dimension and indicative of a set of values corresponding to the dimension;
a first component referencing at least one dimension;
a second component referencing a value relative to the dimension referenced by the first component;
for each component, a subquery based on a subset of dimensions of the multidimensional datacube for computing the subquery and a dependency on other components, including:
a subquery for retrieving the data referenced by the first component;
a subquery for retrieving the data referenced by the second component, further comprising:
a plurality of subcubes, further comprising a first subcube for satisfying the first subquery and a second subcube for satisfying the second subquery, and
the vertices of the tree denoting a hierarchical ordering including a node for each subquery and a node for each query operation performed on the subquery nodes for satisfying the query request, further comprising:
defining, in the hierarchical ordering, a recursive reference from a dimension in the first subcube to the relative reference of a dimension in the second subcube; and
recursively retrieving values from the second subcube based on the corresponding relative value in the first subcube.

9. The data structure of claim 8, wherein the subqueries reference one fact table and one or more dimensional tables.

10. The data structure of claim 9, further comprising defining, in the hierarchical ordering, a recursive reference from the dimension in a first subcube of the plurality of subcubes to a second subcube.

11. The data structure of claim 10, wherein the hierarchical ordering includes a node based on recursively retrieved values from the second subcube based on the corresponding relative value in the first subcube.

12. The data structure of claim 8, wherein the tree includes a join for the node joining the subqueries and a node for an aggregation of a value corresponding to each of the subqueries.

13. In a datacube environment having a multidimensional arrangement of data adapted for OLAP (Online Analytical Processing), a method of planning query operations for retrieving a response to a query request, comprising:
receiving, at a query engine, a request to retrieve data from the datacube based on a plurality of selections received from a user interface;
analyzing the received request to determine a plurality of components based on dependencies between the components and a dimensional granularity imposed by each of the components, each component including at least one dimension, the dimension stored in a database table on a storage medium;
identifying, in the request, a first component referencing at least one dimension;
identifying, in the request, a second component referencing a value relative to the dimension referenced by the first component;
forming the components into subqueries, each subquery indicative of a subset of dimensions and one or more conditions, the dimensions stored in a database table on a storage medium, including:
defining a subquery for retrieving the data referenced by the first component;
defining a subquery for retrieving the data referenced by the second component, further comprising:
forming a plurality of subcubes, further comprising a first subcube for satisfying the first subquery and a second subcube for satisfying the second subquery;
identifying dependencies between the subqueries and denoting a cube operation between the subqueries based on the identified dependencies; and
building a hierarchical tree indicative of a hierarchical ordering between the subqueries based on the dependencies for retrieving and rendering the data called for by the received request, further comprising:
defining, in the hierarchical ordering, a recursive reference from a dimension in the first subcube to the relative reference of a dimension in the second subcube; and
recursively retrieving values from the second subcube based on the corresponding relative value in the first subcube.

14. The method of claim 13, wherein the hierarchical tree denotes a plurality of leaf nodes, each leaf node of the plurality of leaf nodes in the hierarchical tree denoting a subquery, the subquery based on a fact and dimensional grouping called for by the query request.

15. A computer program embodying program code on a computer readable non-transitory storage medium that, when executed by a processor, performs steps for implementing a method for planning and performing a logical composition of a query, the query directed to data stored in fact tables of a multidimensional datacube for defining a recursive ordering of subqueries and cube operations for returning a response to a query request, the method comprising:
receiving, at a query engine, a request from a user interface;
analyzing the request to determine components defined by dimensional granularity and dependencies between the data, each component including at least one dimension and indicative of a set of values corresponding to the dimension, the dimension stored in a database table on a storage medium;
identifying, in the request, a first component referencing at least one dimension;

identifying, in the request, a second component referencing a value relative to the dimension referenced by the first component;
forming, for each component, a subquery based on a subset of dimensions of the multidimensional datacube for computing the subquery and a dependency on other components, including:
defining a subquery for retrieving the data referenced by the first component;
defining a subquery for retrieving the data referenced by the second component, further comprising:
forming a plurality of subcubes, further comprising a first subcube for satisfying the first subquery and a second subcube for satisfying the second subquery; and
generating a hierarchical ordering defined by a tree including a node for each subquery and a node for each query operation performed on the subquery nodes, further comprising:
defining, in the hierarchical ordering, a recursive reference from a dimension in the first subcube to the relative reference of a dimension in the second subcube; and
recursively retrieving values from the second subcube based on the corresponding relative value in the first subcube.

* * * * *